July 27, 1937.    G. F. ROBARGE    2,088,094
SPRING WINDING AND ASSEMBLING MACHINE
Filed June 20, 1936    2 Sheets-Sheet 1
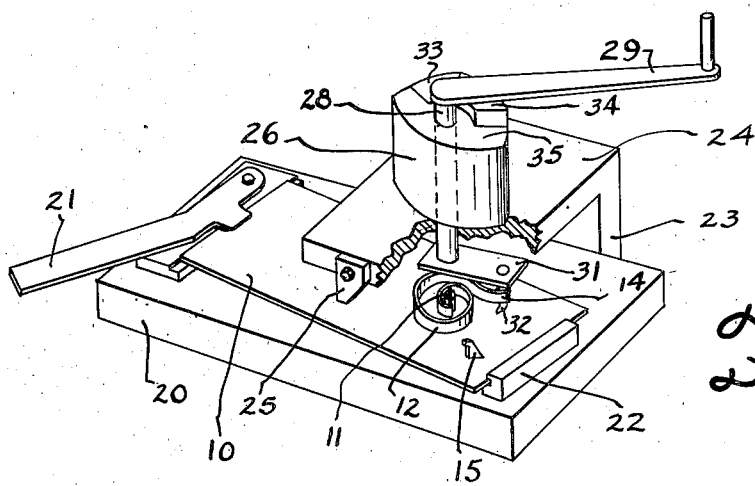
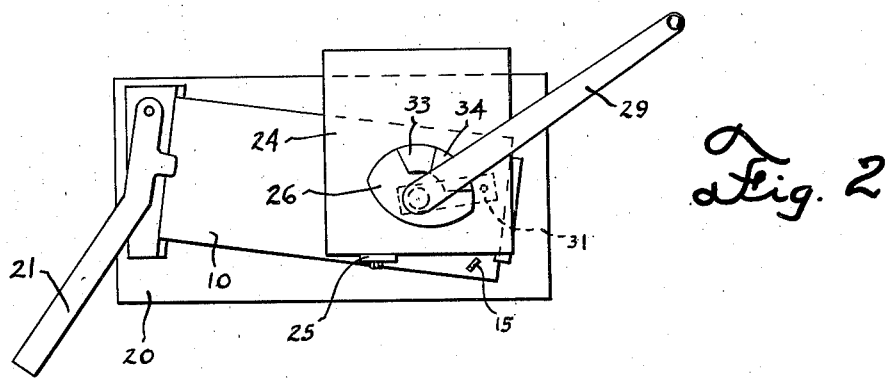
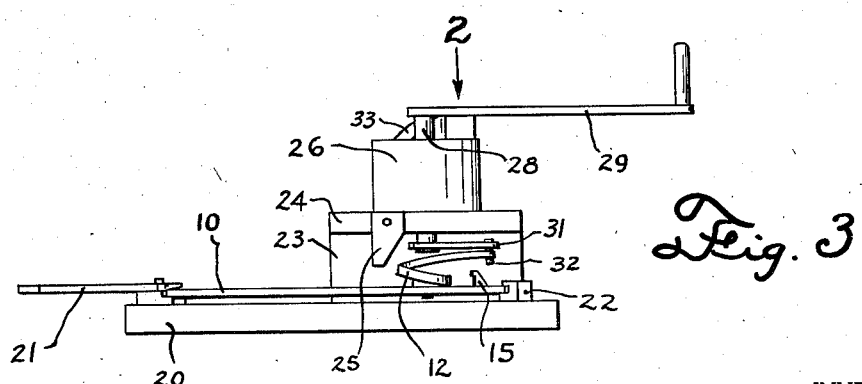
INVENTOR.
George F. Robarge.
BY Daniel J. Cullen
ATTORNEY.

July 27, 1937.　　　G. F. ROBARGE　　　2,088,094
SPRING WINDING AND ASSEMBLING MACHINE
Filed June 20, 1936　　　2 Sheets-Sheet 2

INVENTOR.
George F. Robarge
BY Daniel G. Cullen
ATTORNEY.

Patented July 27, 1937

2,088,094

UNITED STATES PATENT OFFICE 2,088,094

SPRING WINDING AND ASSEMBLING MACHINE

George F. Robarge, Toledo, Ohio

Application June 20, 1936, Serial No. 86,262

2 Claims. (Cl. 29—87.1)

This application relates to a spring winding and assembling machine.

The machine of this application operates to wind the end of a flat coil spring around the center of the same to tension it and to push such end behind a holding lug projecting from a plate having a slotted shaft which receives the inner end of the spring and around which the spring is tensioned.

For an understanding of the machine herein disclosed reference should be had to the accompanying drawings. In these drawings, Fig. 1 is a pictorial view of the machine with parts cut away for purposes of clarity;

Fig. 2 is a view as if taken in the direction of the arrow 2 of Fig. 3;

Fig. 3 is an elevation of the machine shown in Fig. 1;

Figure 4:
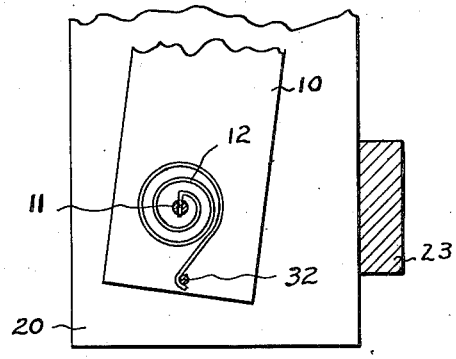
Fig. 4 is a fragmentary plan view.
Figure 6:
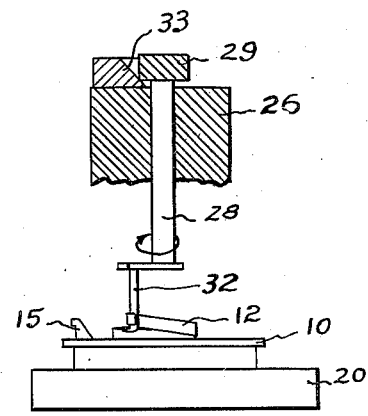
Fig. 6 is a cut-away end view with the parts shown in a position different from that of Fig. 5.
Figure 5:
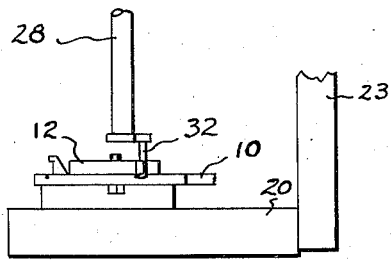
Fig. 5 is a fragmentary end view.
Figure 7:
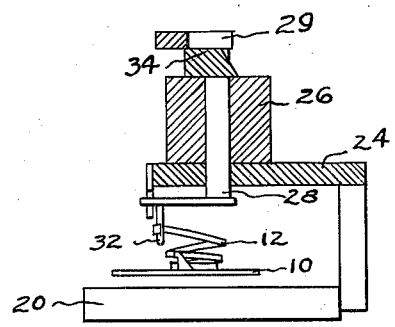
Fig. 7 is another end view with the parts in still another position.

Referring to these drawings, it will be seen that these show a plate 10 having a slotted shaft 11 receiving the inner end of a flat coil spring 12, whose outer end 14 is to be positioned behind a lug 15 projecting from the plate 10, and the machine of the application operates to move the end 14 of the spring from its original position which is remote from the lug 15 towards and over and behind the lug 15, thereby hooking the end of the spring under the lug 15 to hold the spring end in place and to tension the spring around the slotted shaft 11.

The machine itself comprises a base 20 having a clamping element 21 which operates to clamp the plate 10 in place on the base 20 and against an abutment block 22.

On a pedestal 23 positioned at and secured to the back of the base 20 is a plate 24 substantially parallel to the base and provided with a lug 25 at its forward edge. On the plate 24 is a block 26 journalling a rotary shaft 28 whose upper end is provided with a crank handle 29 and whose lower end is provided with a crank 31 having a downwardly projecting hook 32.

The upper surface of the block 26 is formed of the contour illustrated to provide a cam portion 33 which raises the handle 29 and with it the shaft 28, the crank 31 and the hook 32 as the handle 29 rides over it, a portion 34 which maintains these parts so raised as the handle 29 rides over it, and a portion 35 which permits these parts to drop when the handle 29 rides over it.

The operation of the machine is as follows:

A plate 10 having a slotted shaft 11 projecting upwardly therefrom is positioned on the base of the machine and is clamped in place. Thereupon flat coil spring 12 is disposed on the plate 10 with its inner end received in the slotted end of the shaft 11 and with its outer end 14 a substantial distance away from the lug 15 of the plate 10. The handle 29 is then rotated in the direction of the winding of the spring 12 until its crank 31 reaches cam lug 25 whereupon hook 32 is lowered to the level of the spring end 14; further rotation of the handle will cause hook 32 to engage the end 14 of the spring, and due to the positioning of the parts this will be just prior to the engagement of the handle 29 with the lifting cam 33. Continued rotation of the handle will cause it to engage the lifting cam 33 whereupon the hook 32 is raised to raise the end 14 of the spring and further rotation of the handle along the cam portion 34 tensions the spring while maintaining the end 14 so raised, and during this time hook 32 and spring end 14 rotate beyond plate lug 15.

When the handle reaches the cam portion 35, the handle drops and the lower end of spring 14 drops with it and down to the level of lug 15; reverse rotation of the handle then permits the spring end 14 to back up and engage and hook under lug 15, and be free of hook 32.

After hook 32 is free of the spring end 14, and the latter is hooked under lug 15, the clamp handle 21 is moved to permit removal of the plate 10 and another spring 12 may be inserted and clamped for having the spring tensioning operation performed thereon.

I claim:

1. A machine for tensioning a flat coiled spring and positioning the free end thereof into interlocking engagement with a hooked lug projecting from a plate having means for anchoring the inner end of the spring comprising a base, means on the base for clamping a plate in position thereon, a rotary means comprising a shaft having a crank on one end thereof and a handle on the other, means fixed to the base for journalling the shaft with its axis perpendicular to the base and with its crank end nearer the base than is its handle end, but with its crank end spaced from the base, the crank having on its free end a hook, and stationary cam means fixed to the base and positioned to be engaged by parts of the rotary means as the latter rotates for moving the rotary means bodily towards or away from the base as it rotates so as to move the hook on the crank of the shaft and with it the free end of the spring towards or away from the base as such free end of the spring is moved around the anchored inner end of the spring.

2. A machine for tensioning a flat coiled spring and positioning the free end thereof into interlocking engagement with a hooked lug projecting from a plate having means for anchoring the inner end of the spring comprising a base, means on the base for clamping a plate in position thereon, a rotary means comprising a shaft having a crank on one end thereof and a handle on the other, means fixed to the base for journalling the shaft with its axis perpendicular to the base and with its crank end nearer the base than is its handle end, but with its crank end spaced from the base, the crank having on its free end a hook, and stationary cam means fixed to the base and positioned to be engaged by parts of the rotary means as the latter rotates for moving the rotary means bodily towards or away from the base as it rotates so as to move the hook on the crank of the shaft and with it the free end of the spring towards or away from the base as such free end of the spring is moved around the anchored inner end of the spring, the cam means being so oriented with respect to the means for clamping the plate on the base that when a plate is properly positioned on the base and clamped thereon the cam means will move the rotary means away from the base when the hook approaches the plate lug and will hold the rotary means away from the base until after the hook has passed the lug and will move the rotary means towards the base after the hook has passed the lug.

GEORGE F. ROBARGE.